(12) United States Patent
Sybrandy et al.

(10) Patent No.: US 11,041,511 B2
(45) Date of Patent: Jun. 22, 2021

(54) HYDRAULIC CYLINDER SERVICE LIFE IMPROVEMENT

(71) Applicant: Caterpillar Global Mining LLC, Tucson, AZ (US)

(72) Inventors: Brian Sybrandy, Marana, AZ (US); Paul Lightfoot, Stoke-On-Trent (GB)

(73) Assignee: Caterpillar Global Mining LLC, Tucson, AZ (US)

( * ) Notice: Subject to any disclaimer, the term of this patent is extended or adjusted under 35 U.S.C. 154(b) by 113 days.

(21) Appl. No.: 16/375,613

(22) Filed: Apr. 4, 2019

(65) Prior Publication Data

US 2019/0309773 A1 Oct. 10, 2019

Related U.S. Application Data

(60) Provisional application No. 62/653,219, filed on Apr. 5, 2018.

(51) Int. Cl.
*F15B 15/14* (2006.01)

(52) U.S. Cl.
CPC ...... *F15B 15/1442* (2013.01); *F15B 15/1433* (2013.01); *F15B 15/1471* (2013.01)

(58) Field of Classification Search
CPC . F15B 15/1461; F15B 15/1442; F16J 15/162; F16J 15/324; F16J 15/166
See application file for complete search history.

(56) References Cited

U.S. PATENT DOCUMENTS

| 4,109,921 | A | 8/1978 | Urbaschek |
| 4,476,772 | A | 10/1984 | Gorman et al. |
| 6,012,847 | A | 1/2000 | Kahle |
| 9,371,846 | B2 | 6/2016 | Van der Heide |
| 2008/0007012 | A1 | 1/2008 | Jeong |
| 2012/0326396 | A1* | 12/2012 | Ajiki ............... F16J 15/3232 277/562 |
| 2015/0123351 | A1* | 5/2015 | Nakamura ......... F16J 15/166 277/562 |

FOREIGN PATENT DOCUMENTS

| CN | 102434672 A | 5/2012 | |
| CN | 102268173 B | 6/2012 | |
| CN | 202707674 U | 1/2013 | |
| CN | 103697015 B | 10/2015 | |
| GB | 756678 A * | 9/1956 | ............. H04N 5/126 |
| GB | 1601674 | 11/1981 | |

* cited by examiner

*Primary Examiner* — Abiy Teka

(57) ABSTRACT

A head end seal assembly for a hydraulic cylinder may include a cylinder seal carrier having a seal carrier bore with a main seal groove and a coating ring groove adjacent the main seal groove. A main seal disposed within the main seal groove is fabricated from a resilient material and engages a rod outer surface of a rod to substantially prevent leakage of pressurized fluid from the hydraulic cylinder. A coating ring disposed within the coating ring groove is fabricated from a thermoplastic polymer such as Teflon and engages the rod outer surface such that portions of the thermoplastic polymer are deposited into indentations on the rod outer surface as the rod slides past the coating ring to smooth the surface and reduce abrasion between the rod and the main seal. A second coating ring on the opposite side of the main seal may coat the rod as it moves in the opposite direction.

20 Claims, 3 Drawing Sheets

HYDRAULIC CYLINDER SERVICE LIFE IMPROVEMENT

CROSS-REFERENCE TO RELATED APPLICATION

This application claims the benefit of U.S. Provisional Application No. 62/653,219, filed Apr. 5, 2018, which is incorporated by reference herein in its entirety.

TECHNICAL FIELD

The present disclosure relates generally to hydraulic cylinders and, more particularly, to head end assemblies and sealing arrangements that incorporate thermoplastic polymer rings, such as Teflon rings, to deposit material into indentations in a rod outer surface to reduce abrasion between the rod outer surface and other seal components.

BACKGROUND

Hydraulic cylinders are used in vehicles and work machines to control various functions and components of the vehicles and work machines. For example, hydraulic cylinders can be used to operate linkages and implements, to control steering of the vehicle or implement, to raise and lower beds in which material may be deposited, and the like. The hydraulic cylinders are operated by pressurized hydraulic fluid that can be applied to either side of an internal piston to alternately extend and retract a rod of the hydraulic cylinder. Retention of the pressurized hydraulic fluid and the relative movement of the rod with respect to other components of the hydraulic cylinder necessitate the use of seals and guiding structures that engage the rod during operation. As in other systems, friction between components moving relative to each other can cause wear on the components and degradation of performance over time. Therefore, minimization of friction and abrasion can extend the service life of hydraulic cylinders and decrease the cost of maintaining the components over time.

SUMMARY OF THE DISCLOSURE

In one aspect of the present disclosure, a head end seal assembly for a hydraulic cylinder is disclosed. The hydraulic cylinder has a cylinder body and a hydraulic cylinder longitudinal axis, a rod having a rod outer surface, a piston end disposed within the cylinder body, and a head end extending outward through a head end opening of the cylinder body, and a piston disposed on the piston end of the rod and slidable within the cylinder body along the hydraulic cylinder longitudinal axis. The head end seal assembly may include a cylinder seal carrier having a seal carrier inner surface defining a seal carrier bore having a seal carrier longitudinal axis, wherein the seal carrier longitudinal axis is aligned with the hydraulic cylinder longitudinal axis when the cylinder seal carrier is mounted at the head end of the cylinder body, wherein the seal carrier inner surface further defines an annular main seal groove and an annular first coating ring groove adjacent the main seal groove. The head end seal assembly may also include a main seal disposed within the main seal groove and fabricated from a resilient material, wherein the main seal engages the rod outer surface to substantially prevent leakage of pressurized fluid from the cylinder body. The head end seal assembly may further include a first coating ring disposed within the first coating ring groove and fabricated from a thermoplastic polymer, wherein the first coating ring engages the rod outer surface such that portions of the thermoplastic polymer are deposited onto the rod outer surface as the rod slides past the first coating ring to smooth the rod outer surface and reduce abrasion between the rod and the main seal.

In another aspect of the present disclosure, a hydraulic cylinder is disclosed. The hydraulic cylinder may include a cylinder body defining a hydraulic cylinder longitudinal axis, a rod having a rod outer surface, a piston end disposed within the cylinder body, and a head end extending outward through a head end opening of the cylinder body, a piston disposed on the piston end of the rod and slidable within the cylinder body along the hydraulic cylinder longitudinal axis, and a head end seal assembly. The head end seal assembly may include a cylinder seal carrier having a seal carrier inner surface defining a seal carrier bore having a seal carrier longitudinal axis, wherein the seal carrier longitudinal axis is aligned with the hydraulic cylinder longitudinal axis when the cylinder seal carrier is mounted at the head end of the cylinder body, wherein the seal carrier inner surface further defines an annular main seal groove and an annular first coating ring groove adjacent the main seal groove. The head end seal assembly may also include a main seal disposed within the main seal groove and fabricated from a resilient material, wherein the main seal engages the rod outer surface to substantially prevent leakage of pressurized fluid from the cylinder body. The head end seal assembly may further includes a first coating ring disposed within the first coating ring groove and fabricated from a thermoplastic polymer, wherein the first coating ring engages the rod outer surface such that portions of the thermoplastic polymer are deposited onto the rod outer surface as the rod slides past the first coating ring to smooth the rod outer surface and reduce abrasion between the rod and the main seal.

In a further aspect of the present disclosure, a head end seal assembly for a hydraulic cylinder is disclosed. The hydraulic cylinder may have a cylinder body and a hydraulic cylinder longitudinal axis, a rod having a rod outer surface, a piston end disposed within the cylinder body, and a head end extending outward through a head end opening of the cylinder body, and a piston disposed on the piston end of the rod and slidable within the cylinder body along the hydraulic cylinder longitudinal axis. The head end seal assembly may include a cylinder seal carrier having a seal carrier inner surface defining a seal carrier bore having a seal carrier longitudinal axis, wherein the seal carrier longitudinal axis is aligned with the hydraulic cylinder longitudinal axis when the cylinder seal carrier is mounted at the head end of the cylinder body, wherein the seal carrier inner surface further defines an annular main seal groove, an annular first coating ring groove and an annular second coating ring groove disposed on opposite sides of the main seal groove, an annular buffer seal groove disposed inward of the main seal groove, the first coating ring groove and the second coating ring groove, and an annular wiper seal groove disposed outward of the main seal groove, the first coating ring groove, the second coating ring groove and the buffer seal groove. The head end seal assembly may also include a main seal disposed within the main seal groove and fabricated from a resilient material, wherein the main seal engages the rod outer surface to substantially prevent leakage of pressurized fluid from the cylinder body, a first coating ring disposed within the first coating ring groove and fabricated from a thermoplastic polymer, wherein the first coating ring engages the rod outer surface such that portions of the thermoplastic polymer are deposited onto the rod outer surface as the rod slides past the first coating ring to smooth the rod outer surface and reduce abrasion between the rod and the main seal, and a second coating ring disposed within the second coating ring groove and fabricated from the thermoplastic polymer, wherein the second coating ring engages the rod outer surface such that portions of the thermoplastic polymer are deposited onto the rod outer surface as the rod slides past the second coating ring to smooth the rod outer surface and reduce abrasion between the rod and the main seal. The head end seal assembly may further include a buffer seal disposed within the buffer seal groove and fabricated from a resilient material, wherein the buffer seal engages the rod outer surface to substantially prevent fluid pressure spikes at the main seal, and a wiper seal disposed within the wiper seal groove and fabricated from a resilient material, wherein the wiper seal engages the rod outer surface to substantially prevent material disposed on the rod outer surface from traversing past the wiper seal when the rod slides past the wiper seal.

Additional aspects are defined by the claims of this patent.

DETAILED DESCRIPTION

Hydraulic cylinders of the type illustrated and described herein and incorporating service life improvements in accordance with the present disclosure can be implemented in vehicles or mobile work machines that perform excavation or other earth-moving and material handling functions at a worksite. Exemplary worksites can have various vehicles and work machines performing various functions. Such worksites may include, for example, mine sites, landfills, quarries, construction sites and the like. The vehicles and work machines at the worksite may be configured to perform tasks generally associated with altering the geography at the worksite, such as dozing operations, grading operations, leveling operations, bulk material removal operations, or any other type of operation that modifies the terrain or geography of the worksite over time. The vehicles and work machines may be mobile machines configured to perform operations associated with industries related to mining, construction, farming, or any other industry known in the art. The vehicles and work machines may embody off-highway trucks, articulated trucks, wheel loaders, rope shovels, excavators, dozers, motor graders, wheel tractor scrapers or other types of work machines that may be manually, semi-autonomously or autonomously operated.

Figure 1:
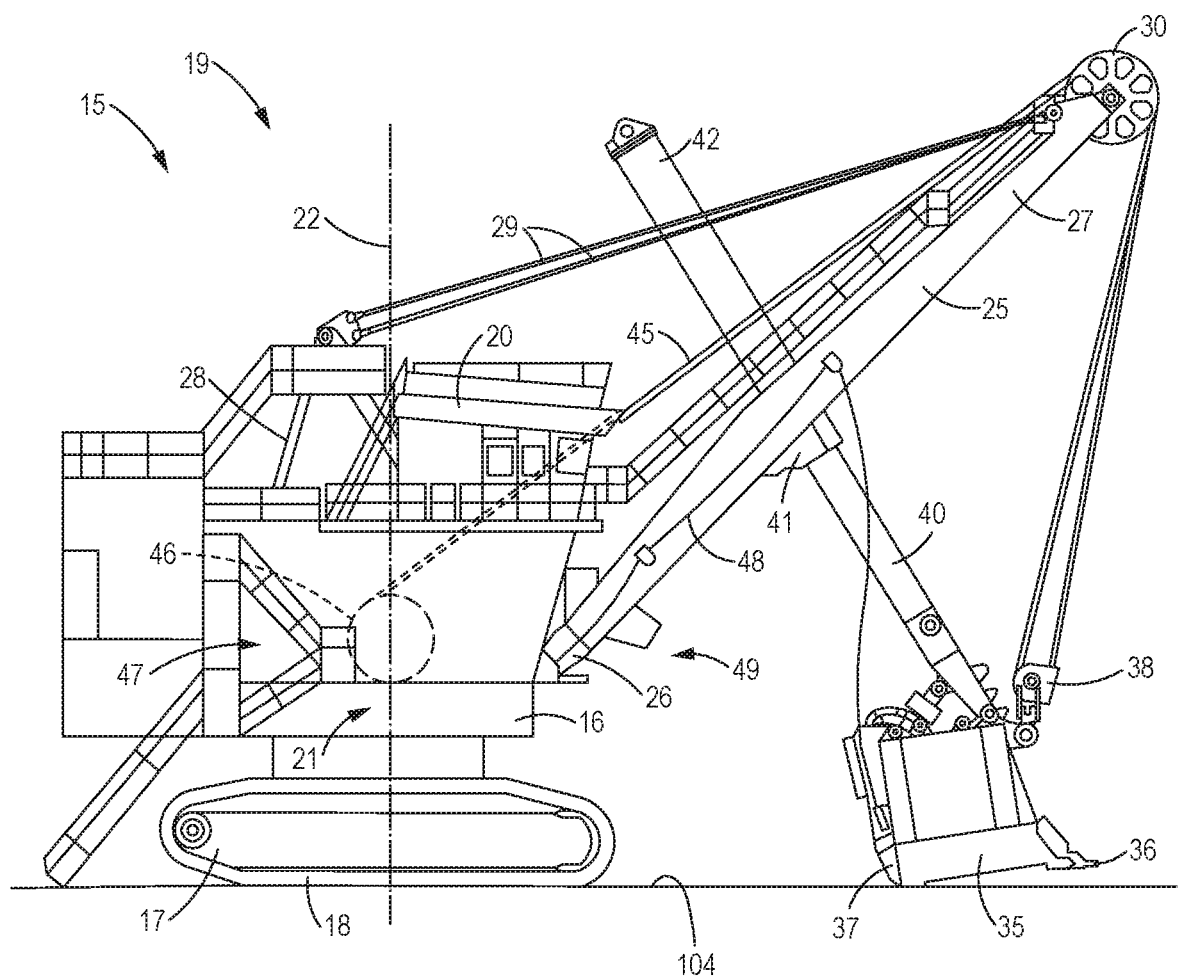
FIG. 1 is a side view of an exemplary work machine in which hydraulic cylinder service life improvements in accordance with the present disclosure may be implemented.

Referring to FIG. 1, one exemplary vehicle or work machine in the form of a rope shovel 15 is depicted. The rope shovel 15 includes a platform or base 16 rotatably mounted on an undercarriage or crawler 17. The crawler 17 may include a ground engaging drive mechanism such as a pair of tracks 18 that operate to propel and turn the rope shovel 15 on a surface 104. The base 16 may include a power unit, indicated generally at 19, and an operator station 20. The power unit 19 provides or distributes electric and/or hydraulic power to various components of the rope shovel 15. A swing motor 21 is operative to control the rotation of the base 16 relative to the crawler 17 about an axis 22.

A linkage assembly or implement system may be mounted on the base 16 and includes a boom 25 having a lower or first end 26 operative connected, such as by being fixedly mounted, to the base 16. An A-frame 28 may be mounted on the based 16 and one or more support cables 29 may extend between the A-frame and an upper or second end 27 of the boom 25 to support the second end of the boom. A pair of spaced apart sheaves 30 may be mounted on the second end 27 of the boom 25.

The linkage assembly may further include a material engaging work implement such as a bucket or dipper 35 fixedly mounted to a connecting member or dipper handle 40. The dipper 35 may include a plurality of material engaging teeth 36 and a pivotable door 37 opposite the teeth to permit dumping or emptying of the dipper 35. At a first closed position, the door 37 retains material in the dipper 35, and at a second open position, material may exit the dipper through the door 37.

A hoist cable 45 extends from a hoist drum 46 on the base 16, is supported by the sheaves 30 on the second end 27 of the boom 25, and engages a bail or padlock 38 associated with the dipper 35. Extension or retraction of the hoist cable 45 through rotation of a hoist motor 47 lowers or raises the height (i.e., the hoist) of the dipper 35 relative to the surface 104. Material within the dipper 35 may be released by opening the door 37 of the dipper 35 through the use of an actuator cable 48 that extends between the door 37 and a door actuator motor 49 on the base 16.

A dipper handle 40 is generally elongated and is operatively connected to the boom 25. More specifically, the dipper handle 40 is slidably supported within a saddle block 41, and the saddle block 41 is pivotably mounted on the boom 25. Extension or retraction (also referred to as "crowd") of the dipper handle 40 may be controlled by a crowd control mechanism operatively connected to the dipper handle 40 and the saddle block 41. In one embodiment, the crowd control mechanism may include a double acting hydraulic cylinder 42 with one side of the hydraulic cylinder 42 operatively connected to the dipper handle 40 and the other side operatively connected to the saddle block 41. The crowd of the dipper handle 40 may thus be controlled by the operation of the hydraulic cylinder 42. In a second embodiment (not shown), a crowd rope and a retract rope may be operatively connected to the dipper handle and routed around a crowd drum. Rotation of the crowd drum controls the crowd of the dipper handle 40. In a third embodiment (not shown), a rack may be mounted on dipper handle and a drive pinion mounted on the saddle block. In the third embodiment, the crowd of the dipper handle 40 may be controlled by operation of the pinion.

The operator station 20 may be physically occupied by an operator that provides input to control the operation of the rope shovel 15. The operator station 20 may include one or more input devices (not shown) that the operator may utilize to provide input to a control system (not shown) to control aspects of the operation of the rope shovel 15. The operator station 20 may also include a plurality of display devices (not shown) to provide information to the operator regarding the status of the rope shovel 15 and the material moving operations.

Figure 2:
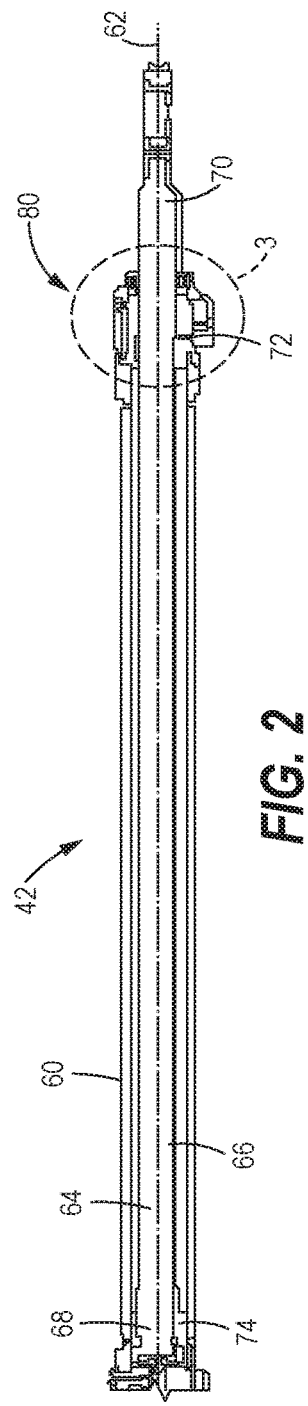
FIG. 2 is a side cross-sectional view of a hydraulic cylinder of the work machine of FIG. 1 in which hydraulic cylinder service life improvements in accordance with the present disclosure may be implemented.

The hydraulic cylinder 42 of the rope shovel 15 is shown in greater detail in the cross-sectional view of FIG. 2. The hydraulic cylinder 42 includes a cylinder body 60 defining a hydraulic cylinder longitudinal axis 62 of the hydraulic cylinder 42. A rod 64 is slidably disposed within the cylinder body 60 and has a rod outer surface 66, a piston end 68 disposed within the cylinder body 60, and a head end 70 extending outward through a head end opening 72 of the cylinder body 60. A piston 74 is disposed on the piston end 68 of the rod 64 and is slidable within the cylinder body 60 along the hydraulic cylinder longitudinal axis 62. The head end opening 72 of the cylinder body 60 is capped by a head end seal assembly 80 attached thereto with the rod 64 extending there through and out of the cylinder body 60.

Figure 3:
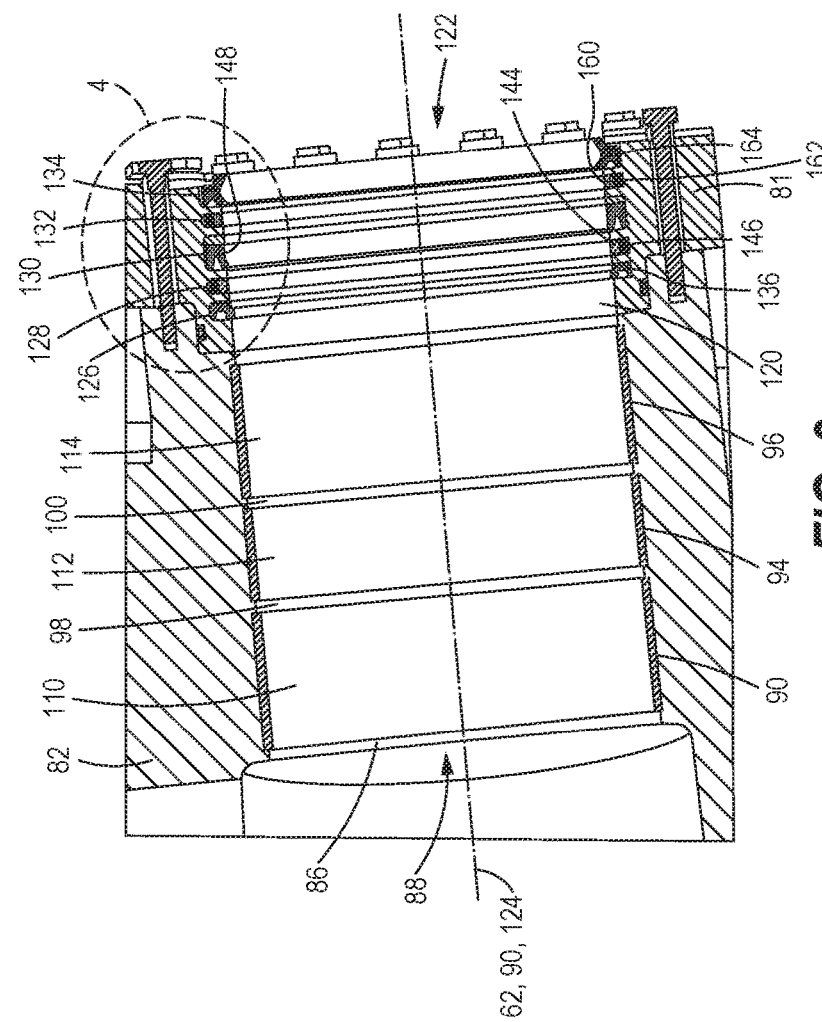
FIG. 3 is an enlarged view of a portion of a head end seal assembly in accordance with the present disclosure of the hydraulic cylinder of FIG. 2.

The head end seal assembly 80 is enlarged in FIG. 3 in which the rod 64 is omitted for purposes of illustrating the internal components of the head end seal assembly 80. The head end seal assembly 80 includes a cylinder seal body 82 connected to the head end 70 of the cylinder body 60, and a cylinder seal carrier 84 mounted on the cylinder seal body 82. The cylinder seal body 82 has a seal body inner surface 86 defining a seal body bore 88 having a seal body longitudinal axis 90. The seal body inner surface 86 further defines a plurality of annular alignment band grooves 92, 94, 96 separated by annular alignment band separation ribs 98, 100. The alignment band separation ribs 98, 100 have rib inner diameters that are greater than a rod outer diameter of the rod 64 to provide clearance there between and avoid metal-to-metal contact and abrasion.

A plurality of alignment bands 110, 112, 114 are provided, with each of the alignment bands 110, 112, 114 being disposed within a corresponding one of the alignment band grooves 92, 94, 96. The alignment bands 110, 112, 114 are fabricated from a condensation polymer material such as glass filled nylon. The alignment bands 110, 112, 114 have a thickness that is greater than a difference between a band groove inner diameter of the alignment band grooves 92, 94, 96 and the rib inner diameter so that alignment band inner surfaces extend inward from the alignment band separation ribs 98, 100 and the seal body inner surface 86. When installed, the alignment bands 110, 112, 114 have band inner diameters that may be approximately equal to the rod outer diameter so that the alignment bands 110, 112, 114 engage the rod 64 during extension from and retraction into the cylinder body 60. The engagement by the alignment bands 110, 112, 114 brings the hydraulic cylinder longitudinal axis 62 substantially into alignment with the seal body longitudinal axis 90.

The cylinder seal carrier 84 is mounted on an outward side of the cylinder seal body 82 from the cylinder body 60 and has a seal carrier inner surface 120 defining a seal carrier bore 122 having a seal carrier longitudinal axis 124. The seal carrier longitudinal axis 124 is substantially aligned with the hydraulic cylinder longitudinal axis 62 and the seal body longitudinal axis 90 when the cylinder seal carrier 84 is mounted on the cylinder seal body 82 at the head end opening 72 of the cylinder body 60. The seal carrier inner surface 120 further defines a series of annular grooves 126, 128, 130, 132, 134 that will receive sealing elements in accordance with the present disclosure that will form the necessary seals to retain pressurized hydraulic fluid within the hydraulic cylinder 42 and improve the service life of the hydraulic cylinder 42.

Figure 4:
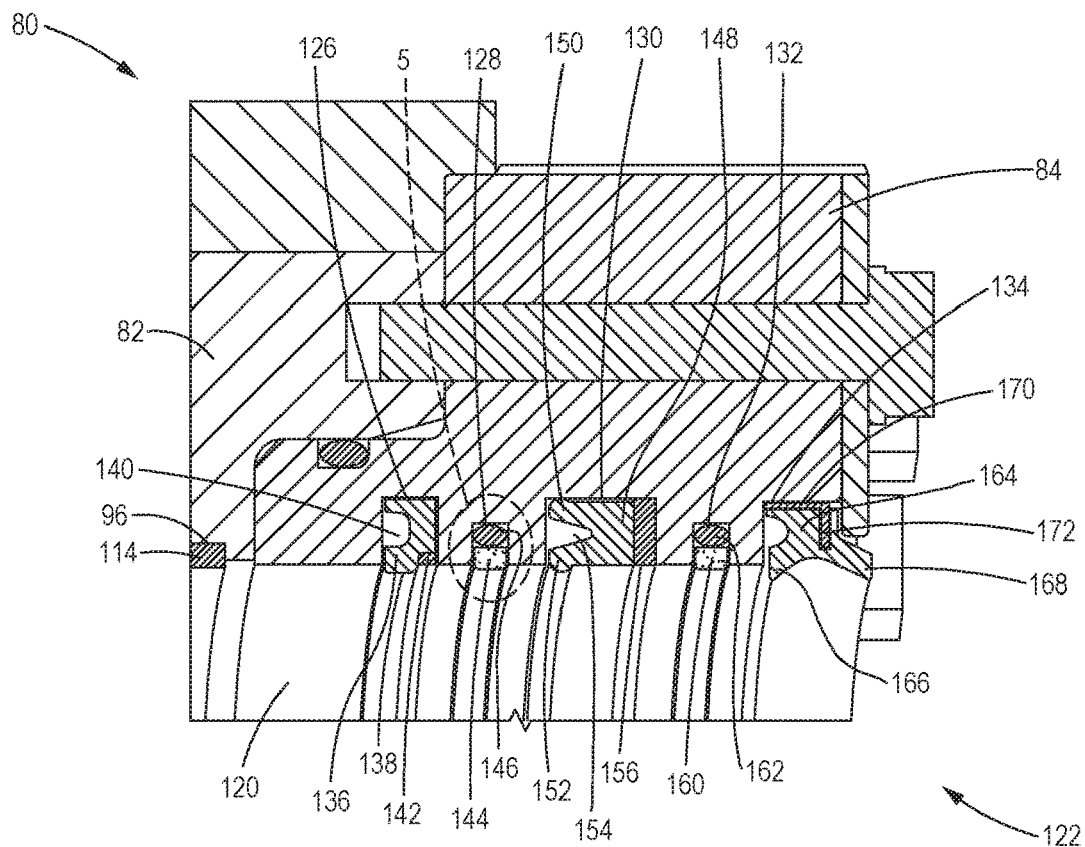
FIG. 4 is a further enlarged view of a portion of a cylinder seal carrier of the head end seal assembly of FIG. 3.

As shown in FIG. 3 and the enlarged view of the cylinder seal carrier 84 at FIG. 4 beginning from an inward end of the cylinder seal carrier 84, the seal carrier inner surface 120 defines a buffer seal groove 126 having a buffer seal 136 disposed therein. The buffer seal 136 may be fabricated from a resilient material, such as rubber or polyurethane, and includes an inwardly extending buffer seal lip 138 that is dimensioned to engage the rod outer surface 66, and an annular buffer actuation reservoir 140 radially outward from the buffer seal lip 138 and opening toward the cylinder body 60. A backup ring 142 is also disposed within the buffer seal groove 126 and prevents the buffer seal 136 from being extruded out of the buffer seal groove 126 when subjected to high hydraulic fluid pressures. The buffer seal 136 is configured to allow hydraulic fluid within the normal operating range of pressures for the hydraulic cylinder 42 to flow past the buffer seal 136 to the downstream seal elements of the cylinder seal carrier 84. However, during internal pressure spikes outside the normal operation pressure range that can occur such as when elements controlled by the hydraulic cylinder 42 are subjected to impacts, the highly pressurized hydraulic fluid is forced into the buffer actuation reservoir 140 and creates a radially inward force pressing the buffer seal 136 more tightly into engagement with the rod outer surface 66 to dampen the pressure spike and limit the maximum pressure transmitted to the downstream sealing elements.

Proceeding outward from the buffer seal groove 126, the seal carrier inner surface 120 defines a first coating ring groove 128. The first coating ring groove 128 has a first coating ring 144 disposed therein and extending radially inward relative to the seal carrier inner surface 120 so that the first coating ring 144 engages the rod outer surface 66 in a manner discussed more fully below. The first coating ring 144 is fabricated from a thermoplastic polymer such as Teflon that is softer and more pliable than the buffer seal 136. In the illustrated embodiment, a first energizing ring 146 fabricated from a resilient material is disposed within the first coating ring groove 128 between the seal carrier inner surface 120 and the first coating ring 144. The first energizing ring 146 compresses the first coating ring 144 against the rod outer surface 66 to increase a contact pressure between the first coating ring 144 and the rod outer surface 66. As described further below, the first coating ring 144 will transfer material to the rod outer surface 66 over time, and the first energizing ring 146 will continue to provide radially inward force on the first coating ring 144 to maintain contact between the first coating ring 144 and the rod outer surface 66 as the material wears away from the first coating ring 144.

Outward from the first coating ring groove 128, the seal carrier inner surface 120 defines a main seal groove 130 having a main seal 148 disposed within the main seal groove 130. The main seal 148 is fabricated from a resilient material such as polyurethane or rubber, and is configured to engage the rod outer surface 66 to substantially prevent leakage of pressurized fluid from the cylinder body 60 under the normal operation pressure range for the hydraulic cylinder 42. The main seal 148 includes an outer sealing lip 150 engaging the main seal groove 130, an inwardly extending inner sealing lip 152 that engages the rod outer surface 66, and an annular main seal actuation reservoir 154 between the outer sealing lip 150 and the inner sealing lip 152 and opening toward the cylinder body 60 and the buffer seal 136. A backup ring 156 is also disposed within the main seal groove 130 and prevents the main seal 148 from being extruded out of the main seal groove 130 when subjected to high hydraulic fluid pressures. The main seal 148 is configured to be energized by the hydraulic pressure of the hydraulic fluid within the main seal actuation reservoir 154 to create a radially inward sealing force pressing the main seal 148 into engagement with the rod outer surface 66 that is sufficient to substantially prevent the pressurized hydraulic fluid from flowing past the main seal 148.

Outward of the main seal groove 130, the seal carrier inner surface 120 defines a second coating ring groove 132 such that the first coating ring groove 128 and the second coating ring groove 132 are disposed on opposite sides of the main seal groove 130. A second coating ring 160 and a second energizing ring 162 are disposed within the second coating ring groove 132 in a similar manner as the first coating ring 144 and the first energizer ring 146 are disposed within the first coating ring groove 128 as described above. The second coating ring 160 is fabricated from the thermoplastic polymer such as Teflon, and the second energizing ring 162 is fabricated from a resilient material. The second energizing ring 162 compresses the second coating ring 160 against the rod outer surface 66 so that material from the second coating ring 160 is transferred to the rod outer surface 66 over time as described further below.

At an outward most area of the cylinder seal carrier 84, the seal carrier inner surface 120 defines a wiper seal groove 134 having a wiper seal 164 disposed within the wiper seal groove 134 and fabricated from a resilient material such as polyurethane or rubber. The wiper seal 164 may be a two-way wiper seal having an inward wiper seal lip 166 and an outward wiper seal lip 168 that engage and scrape the rod outer surface 66 to substantially prevent material disposed on the rod outer surface 66 from traversing past the wiper seal 164 when the rod 64 slides past the wiper seal 164. The wiper seal 164 further includes an annular metal can 170 press fit into the wiper seal groove 134 and dispose between the seal carrier inner surface 120 and the wiper seal 164. The wiper seal 164 may be bonded to the metal can 170, and the metal can 170 may further include an inwardly extending wiper seal retention flange 172 functioning similar to the backup rings 142, 156 to prevent the wiper seal 164 from being extruded from the wiper seal groove 134 due to friction between the wiper seal lips 166, 168 and the rod outer surface 66.

INDUSTRIAL APPLICABILITY

Under ideal circumstances, the rod 64 of the hydraulic cylinder 42 is fabricated so that the rod outer surface 66 is smooth and minimizes friction between the rod outer surface 66 and the buffer seal 136, the wiper seal 164 and, most importantly, the main seal 148. However, depending on the manufacturing conditions and the quality of replacement parts that may be installed in the hydraulic cylinder 42, the rod outer surface 66 may not be as smooth as desired. The rod outer surface 66 at times can have macroscopic or microscopic indentations or cups therein that can cause additional friction and abrasion as the rod outer surface 66 moves back and forth past the seals 136, 148, 164. The additional friction and abrasion can shorten the service life of the main seal 148 and increase the frequency of replacement of the main seal 148 and the overall time that the machine 15 is taken out of service for maintenance on the hydraulic cylinder 42.

Figure 5:
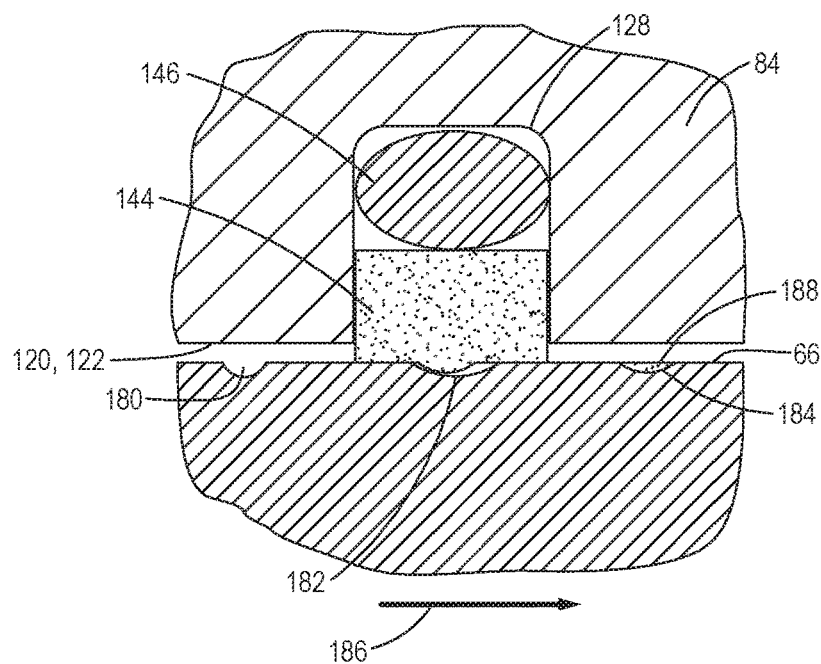
FIG. 5 is a still further enlarged view of the portion of the cylinder seal carrier of FIG. 4.

The head end seal assembly 80 in accordance with the present disclosure as illustrated and described above can serve to smooth the rod outer surface 66 during operation of the hydraulic cylinder 42 and thereby extend the service life of the main seal 148. The first coating ring 144 and the second coating ring 160 are positioned on either side of the main seal 148 so that the rod outer surface 66 is conditioned prior to sliding past the main seal 148. FIG. 5 provides an enlarged view of the interface between the rod outer surface 66 of the rod 64 and the first coating ring 144. As shown in the enlarged view, the rod outer surface 66 may be of less than ideal quality such that the manufacturing process for the rod 64 has produced indentations 180, 182, 184 in the rod outer surface 66. The size of the indentations 180, 182, 184 in FIG. 5 is exaggerated for purposes of illustration, and those skilled in the art will understand that the transfer of material illustrated and discussed herein will be applicable for indentations in the rod outer surface 66 of varying sizes.

As the rod 64 moves through an extension stroke in a direction indicated by an arrow 186, the indentation 180 on the rod outer surface 66 upstream from the first coating ring 144 does not have material deposited therein. The discontinuity in the rod outer surface 66 at the indentation 180 would cause greater friction and abrasion with the main seal 148 than smooth portions of the rod outer surface 66. The coating rings 144, 160 can minimize the undesirable discontinuities by having portions of the coating rings 144, 160 wear away and deposit in the indentations 180, 182, 184 as they pass on the way to the main seal 148. As shown, the indentation 182 sliding past the first coating ring 144 is engaging the inner surface of the first coating ring 144 to remove a small amount of material. When an indentation such as the indentation 184 is beyond the first coating ring 144, the indentation 184 is filled with a coating material deposit 188 that reduces or eliminates the discontinuity in the rod outer surface 66 at the indentation 184. With the indentations 180, 182, 184 filled with the coating material deposits 188, the friction and abrasion will be reduced when the indentations 180, 182, 184 slide past the main seal 148 from what would otherwise be experienced if the indentations 180, 182, 184 were empty. It should be noted that this use of thermoelastic polymers such as Teflon in the head end seal assembly 80 to deposit material on the rod outer surface 66 contrasts with traditional uses of Teflon in seal assemblies where Teflon rings are used to capture debris and particles to prevent the debris from reaching and fouling the seals.

A similar process of depositing coating material deposits 188 in the indentations 180, 182, 184 occurs with the second coating ring 160 when the rod 64 moves in the direction opposite the arrow 186 during a retraction stroke. With this arrangement, the indentations 180, 182, 184 have the opportunity to have the coating material deposited therein before any instance of sliding past the main seal 148. Depending on the specific conditions within the head end seal assembly 80, coating material deposits 188 may be extruded or otherwise dislodged from the indentations 180, 182, 184 as the indentations 180, 182, 184 slide past the main seal 148 or are engaged by the buffer seal 136 and/or the wiper seal 164 during each extension or retraction of the rod 64. In such cases, fresh coating material deposits 188 may be formed in the indentations 180, 182, 184 each time the rod 64 moves. In other implementations, the coating material deposits 188 may remain within the indentations 180, 182, 184 through several cycles of extension and retraction of the rod 64, and fresh coating material deposits 188 may be formed in the indentations 180, 182, 184 as necessary to replace the dislodged coating material deposits 188.

The service life of the head end seal assembly 80 is further improved by the configuration of the alignment band grooves 92, 94, 96 and the alignment bands 110, 112, 114 in the cylinder seal body 82. The glass filled nylon bands 110, 112, 114 replace bands formed from phenolic resins. The nylon bands 110, 112, 114 are more durable than the bands formed from phenolic resins, as the phenolic resin bands can at times experience brittle failure. Moreover, the current configuration of the alignment band grooves 92, 94, 96 and the alignment bands 110, 112, 114 provides increased surface area over previously-known alignment band arrangements for improved distribution of stresses and reduced wear resulting in further improvements to the service life of the hydraulic cylinder 42.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A head end seal assembly for a hydraulic cylinder having a cylinder body and a hydraulic cylinder longitudinal axis, a rod having a rod outer surface, a piston end disposed within the cylinder body, and a head end extending outward through a head end opening of the cylinder body, and a piston disposed on the piston end of the rod and slidable within the cylinder body along the hydraulic cylinder longitudinal axis, the head end seal assembly comprising:
   a cylinder seal carrier having a seal carrier inner surface defining a seal carrier bore having a seal carrier longitudinal axis, wherein the seal carrier longitudinal axis is aligned with the hydraulic cylinder longitudinal axis when the cylinder seal carrier is mounted at the head end of the cylinder body, wherein the seal carrier inner surface further defines an annular main seal groove, an annular buffer seal groove inward of the main seal groove and an annular first coating ring groove between the main seal groove and the buffer seal groove;
   a main seal disposed within the main seal groove and fabricated from a resilient material, wherein the main seal engages the rod outer surface to substantially prevent leakage of pressurized fluid from the cylinder body;
   a buffer seal disposed within the buffer seal groove and fabricated from a resilient material, wherein the buffer seal engages the rod outer surface to substantially prevent fluid pressure spikes at the main seal; and
   a first coating ring disposed within the first coating ring groove and fabricated from a thermoplastic polymer, wherein the first coating ring engages the rod outer surface such that portions of the thermoplastic polymer are deposited onto the rod outer surface as the rod slides past the first coating ring to smooth the rod outer surface and reduce abrasion between the rod and the main seal.

2. The head end seal assembly of claim 1, wherein the portions of the thermoplastic polymer deposited onto the rod outer surface are transferred into indentations in the rod outer surface to smooth the rod outer surface.

3. The head end seal assembly of claim 1, wherein the thermoplastic polymer of the first coating ring is a Teflon material.

4. The head end seal assembly of claim 1, comprising a first energizing ring fabricated from a resilient material and disposed within the first coating ring groove between the seal carrier inner surface and the first coating ring so that the first coating ring is compressed against the rod outer surface by the first energizer ring.

5. The head end seal assembly of claim 1, wherein the seal carrier inner surface further defines an annular second coating ring groove adjacent the main seal groove and on an opposite side of the main seal groove from the first coating ring groove, the head end seal assembly comprising a second coating ring disposed within the second coating ring groove and fabricated from the thermoplastic polymer, wherein the second coating ring engages the rod outer surface such that portions of the thermoplastic polymer are deposited onto the rod outer surface as the rod slides past the second coating ring to smooth the rod outer surface and reduce abrasion between the rod and the main seal.

6. The head end seal assembly of claim 5, comprising a second energizing ring fabricated from a resilient material and disposed within the second coating ring groove between the seal carrier inner surface and the second coating ring so that the second coating ring is compressed against the rod outer surface by the second energizing ring.

7. The head end seal assembly of claim 1, wherein the seal carrier inner surface further defines an annular wiper seal groove outward of the main seal groove, the first coating ring groove and the buffer seal groove, the head end seal assembly comprising a wiper seal disposed within the wiper seal groove and fabricated from a resilient material, wherein the wiper seal engages the rod outer surface to substantially prevent material disposed on the rod outer surface from traversing past the wiper seal when the rod slides past the wiper seal.

8. The head end seal assembly of claim 1, comprising:
   a cylinder seal body having a seal body inner surface defining a seal body bore having a seal body longitudinal axis, wherein the seal body longitudinal axis is aligned with the hydraulic cylinder longitudinal axis and the seal carrier longitudinal axis when the cylinder seal body is mounted at the head end of the cylinder body and the cylinder seal carrier is mounted to the cylinder seal body, wherein the seal body inner surface further defines a plurality of annular alignment band grooves; and
   a plurality of alignment bands each disposed within a corresponding one of the plurality of annular alignment band grooves and fabricated from a condensation polymer, wherein the plurality of alignment bands extend inward from the seal body inner surface and engages the rod to support the rod during extension from and retraction into the cylinder body.

9. The head end seal assembly of claim 8, wherein the plurality of alignment bands are nylon bands.

10. A hydraulic cylinder, comprising:
    a cylinder body defining a hydraulic cylinder longitudinal axis;

a rod having a rod outer surface, a piston end disposed within the cylinder body, and a head end extending outward through a head end opening of the cylinder body;

a piston disposed on the piston end of the rod and slidable within the cylinder body along the hydraulic cylinder longitudinal axis; and a head end seal assembly, comprising:

a cylinder seal carrier having a seal carrier inner surface defining a seal carrier bore having a seal carrier longitudinal axis, wherein the seal carrier longitudinal axis is aligned with the hydraulic cylinder longitudinal axis when the cylinder seal carrier is mounted at the head end of the cylinder body, wherein the seal carrier inner surface further defines an annular main seal groove, an annular buffer seal groove inward of the main seal groove and an annular first coating ring groove between the main seal groove and the buffer seal groove;

a main seal disposed within the main seal groove and fabricated from a resilient material, wherein the main seal engages the rod outer surface to substantially prevent leakage of pressurized fluid from the cylinder body;

a buffer seal disposed within the buffer seal groove and fabricated from a resilient material, wherein the buffer seal engages the rod outer surface to substantially prevent fluid pressure spikes at the main seal; and a first coating ring disposed within the first coating ring groove and fabricated from a thermoplastic polymer, wherein the first coating ring engages the rod outer surface such that portions of the thermoplastic polymer are deposited onto the rod outer surface as the rod slides past the first coating ring to smooth the rod outer surface and reduce abrasion between the rod and the main seal.

11. The hydraulic cylinder of claim 10, wherein the thermoplastic polymer of the first coating ring is a Teflon material.

12. The hydraulic cylinder of claim 10, comprising a first energizing ring fabricated from a resilient material and disposed within the first coating ring groove between the seal carrier inner surface and the first coating ring so that the first coating ring is compressed against the rod outer surface by the first energizer ring.

13. The hydraulic cylinder of claim 10, wherein the seal carrier inner surface further defines an annular second coating ring groove adjacent the main seal groove and on an opposite side of the main seal groove from the first coating ring groove, the head end seal assembly comprising a second coating ring disposed within the second coating ring groove and fabricated from the thermoplastic polymer, wherein the second coating ring engages the rod outer surface such that portions of the thermoplastic polymer are deposited onto the rod outer surface as the rod slides past the second coating ring to smooth the rod outer surface and reduce abrasion between the rod and the main seal.

14. The hydraulic cylinder of claim 13, comprising a second energizing ring fabricated from a resilient material and disposed within the second coating ring groove between the seal carrier inner surface and the second coating ring so that the second coating ring is compressed against the rod outer surface by the second energizing ring.

15. The hydraulic cylinder of claim 10, wherein the seal carrier inner surface further defines an annular wiper seal groove outward of the main seal groove, the first coating ring groove and the buffer seal groove, the head end seal assembly comprising a wiper seal disposed within the wiper seal groove and fabricated from a resilient material, wherein the wiper seal engages the rod outer surface to substantially prevent material disposed on the rod outer surface from traversing past the wiper seal when the rod slides past the wiper seal.

16. A head end seal assembly for a hydraulic cylinder having a cylinder body and a hydraulic cylinder longitudinal axis, a rod having a rod outer surface, a piston end disposed within the cylinder body, and a head end extending outward through a head end opening of the cylinder body, and a piston disposed on the piston end of the rod and slidable within the cylinder body along the hydraulic cylinder longitudinal axis, the head end seal assembly comprising:

a cylinder seal carrier having a seal carrier inner surface defining a seal carrier bore having a seal carrier longitudinal axis, wherein the seal carrier longitudinal axis is aligned with the hydraulic cylinder longitudinal axis when the cylinder seal carrier is mounted at the head end of the cylinder body, wherein the seal carrier inner surface further defines an annular main seal groove, an annular first coating ring groove and an annular second coating ring groove disposed on opposite sides of the main seal groove, an annular buffer seal groove disposed inward of the main seal groove, the first coating ring groove and the second coating ring groove, and an annular wiper seal groove disposed outward of the main seal groove, the first coating ring groove, the second coating ring groove and the buffer seal groove;

a main seal disposed within the main seal groove and fabricated from a resilient material, wherein the main seal engages the rod outer surface to substantially prevent leakage of pressurized fluid from the cylinder body;

a first coating ring disposed within the first coating ring groove and fabricated from a thermoplastic polymer, wherein the first coating ring engages the rod outer surface such that portions of the thermoplastic polymer are deposited onto the rod outer surface as the rod slides past the first coating ring to smooth the rod outer surface and reduce abrasion between the rod and the main seal;

a second coating ring disposed within the second coating ring groove and fabricated from the thermoplastic polymer, wherein the second coating ring engages the rod outer surface such that portions of the thermoplastic polymer are deposited onto the rod outer surface as the rod slides past the second coating ring to smooth the rod outer surface and reduce abrasion between the rod and the main seal;

a buffer seal disposed within the buffer seal groove and fabricated from a resilient material, wherein the buffer seal engages the rod outer surface to substantially prevent fluid pressure spikes at the main seal; and a wiper seal disposed within the wiper seal groove and fabricated from a resilient material, wherein the wiper seal engages the rod outer surface to substantially prevent material disposed on the rod outer surface from traversing past the wiper seal when the rod slides past the wiper seal.

17. The head end seal assembly of claim 16, wherein the thermoplastic polymer of the first coating ring is a Teflon material.

18. The head end seal assembly of claim 16, comprising:

a first energizing ring fabricated from a resilient material and disposed within the first coating ring groove between the seal carrier inner surface and the first coating ring so that the first coating ring is compressed against the rod outer surface by the first energizer ring; and a second energizing ring fabricated from a resilient material and disposed within the second coating ring groove between the seal carrier inner surface and the second coating ring so that the second coating ring is compressed against the rod outer surface by the second energizing ring.

19. The head end seal assembly of claim 16, comprising:

a cylinder seal body having a seal body inner surface defining a seal body bore having a seal body longitudinal axis, wherein the seal body longitudinal axis is aligned with the hydraulic cylinder longitudinal axis and the seal carrier longitudinal axis when the cylinder seal body is mounted at the head end of the cylinder body and the cylinder seal carrier is mounted to the cylinder seal body, wherein the seal body inner surface further defines a plurality of annular alignment band grooves; and a plurality of alignment bands each disposed within a corresponding one of the plurality of annular alignment band grooves and fabricated from a condensation polymer, wherein the plurality of alignment bands extend inward from the seal body inner surface and engages the rod to support the rod during extension from and retraction into the cylinder body.

20. The head end seal assembly of claim 19, wherein the plurality of alignment bands are nylon bands.

\* \* \* \* \*